US011651154B2

(12) United States Patent
McNeillie et al.

(10) Patent No.: US 11,651,154 B2
(45) Date of Patent: May 16, 2023

(54) ORCHESTRATED SUPERVISION OF A COGNITIVE PIPELINE

(71) Applicant: INTERNATIONAL BUSINESS MACHINES CORPORATION, Armonk, NY (US)

(72) Inventors: Patrick K. McNeillie, Campbell, CA (US); Denilson Nastacio, Apex, NC (US); Ronak Sumbaly, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 16/035,122

(22) Filed: Jul. 13, 2018

(65) Prior Publication Data

US 2020/0019607 A1    Jan. 16, 2020

(51) Int. Cl.
*G06N 3/04* (2023.01)
*G06F 40/205* (2020.01)
(Continued)

(52) U.S. Cl.
CPC .......... *G06F 40/205* (2020.01); *G06F 16/316* (2019.01); *G06F 16/93* (2019.01);
(Continued)

(58) Field of Classification Search
CPC ...... G06F 40/205; G06F 16/93; G06F 16/316; G06N 3/08; G06N 5/02; G06N 5/04; G06N 20/00
See application file for complete search history.

(56) References Cited

U.S. PATENT DOCUMENTS 8,996,350 B1 * 3/2015 Dub ................. G06F 17/28
704/1
9,348,900 B2   5/2016 Alkov et al.
(Continued)

OTHER PUBLICATIONS

Agerri, R. et al, Multilingual Event Detection using the NewsReader Pipelines, [retrieved Oct. 22, 2021] Retrieved from Internet:<https://ixa.ehu.eus/sites/default/files/dokumentuak/8833/INTEROP-10.pdf> (Year: 2016).*

(Continued)

*Primary Examiner* — Miranda M Huang
*Assistant Examiner* — Bart I Rylander
(74) *Attorney, Agent, or Firm* — Anthony R. Curro (57) ABSTRACT

A method, computer system, and a computer program product for coordinating supervision of at least one document processing pipeline is provided. The present invention may include receiving one or more documents. The present invention may then include parsing the received one or more documents to identify one or more performance indicators associated with the received one or more documents. The present invention may also include processing the parsed one or more documents based on a series of processor nodes. The present invention may further include identifying one or more deviations associated with the identified one or more performance indicators. The present invention may also include transferring the identified one or more deviations to a supervisor component. The present invention may then include generating at least one deviation escalation. The present invention may then further include reprocessing the generated at least one deviation escalation after a human response.

21 Claims, 6 Drawing Sheets

(51) Int. Cl.
  *G06F 16/93* (2019.01)
  *G06F 16/31* (2019.01)
  *G06N 3/08* (2023.01)
  *G06N 5/02* (2023.01)
  *G06N 5/04* (2023.01)
  *G06N 7/01* (2023.01)
  *G06N 20/00* (2019.01)

(52) U.S. Cl.
  CPC .............. *G06N 3/08* (2013.01); *G06N 5/02* (2013.01); *G06N 5/04* (2013.01); *G06N 7/01* (2023.01); *G06N 20/00* (2019.01)

(56) References Cited

U.S. PATENT DOCUMENTS

| | | | |
|---|---|---|---|
| 9,424,518 | B1 | 8/2016 | Basu et al. |
| 9,606,990 | B2 * | 3/2017 | Allen .................... G06F 40/205 |
| 2014/0372483 | A1 * | 12/2014 | Marmanis ......... G06F 17/30539 707/776 |
| 2015/0117721 | A1 * | 4/2015 | Rhodes ................. G06Q 10/06 382/112 |
| 2015/0161230 | A1 | 6/2015 | Alkov et al. |
| 2016/0104076 | A1 | 4/2016 | Maheshwari et al. |
| 2017/0091664 | A1 | 3/2017 | Sanchez et al. |
| 2017/0169103 | A1 * | 6/2017 | Juneja ............... G06F 17/30687 |
| 2017/0220743 | A1 * | 8/2017 | Imler ..................... G16H 10/60 |

OTHER PUBLICATIONS

Alba, A. et al, Multi-lingual Concept Extraction with Linked Data and Human-in-the-Loop, [retrieved Oct. 22, 2021]. Retrieved from Internet:<https://dl.acm.org/doi/pdf/10.1145/3148011.3148021> (Year: 2017).*

Maderlechner, G. et al, Classification of documents by form and content, [retrieved Oct. 22, 2021]. Retrieved from Internet:< https://www.infona.pl/resource/bwmeta1.element.elsevier-d369e458-90bb-3420-a5ae-6db23a5c72a7> (Year: 1997).*

Muller, M. et al, Guidance for Multi-Type Entity Graphs from Text Collections, [retrieved Oct. 22, 2021]. Retrieved from Internet:<https://diglib.eg.org/bitstream/handle/10.2312/eurova20171111/001-005.pdf?sequence=1&isAllowed=n> (Year: 2017).*

Van der Aa, H. et al, Transforming Unstructured Natural Language Descriptions into Measurable Process Performance Indicators Using Hidden Markov Models, [retrieved Oct. 22, 2021]. Retrieved from Internet:<https://research.vu.nl/en/publications/transforming-unstructured-natural-language-descriptions> (Year: 2017).*

Vossen, P. et al, NewsReader: Using knowledge resources in a cross-lingual reading machine to generate more knowledge from massive streams of news, [retrieved Oct. 22, 2021]. Retrieved from Internet: https://www.sciencedirect.com/science/article/pii/S0950705116302271> (Year: 2016).*

Charalampous, A., et al , Classifying Document Types to Enhance Search and Recommendations in Digital Libraries, [retrieved Mar. 15, 2022]. Retrieved from Internet:<https://link.springer.com/chapter/10.1007/978-3-319-67008-9_15> (Year: 2017).*

Mell et al., "The NIST Definition of Cloud Computing," National Institute of Standards and Technology, Sep. 2011, p. 1-3, Special Publication 800-145.

Van Der Aa et al., "Transforming Unstructured Natural Language Descriptions into Measurable Process Performance Indicators Using Hidden Markov Models," Information Systems, 2017, p. 1-36, vol. 71, Elsevier Ltd.

* cited by examiner

ORCHESTRATED SUPERVISION OF A COGNITIVE PIPELINE

BACKGROUND

The present invention relates generally to the field of computing, and more particularly to multilingual natural language processing and language adaption.

A machine learning pipeline may involve the activities of preparation and ingestion of unstructured and structured text, restructuring of the resulting information in a knowledge representation form, and the exposure of that knowledge through interfaces as varied as simple question and answer (i.e., Q&A) systems to large bodies of data exported for consumption in other systems.

SUMMARY

Embodiments of the present invention disclose a method, computer system, and a computer program product for coordinating supervision of at least one document processing pipeline. The present invention may include receiving one or more documents. The present invention may then include parsing the received one or more documents to identify one or more performance indicators associated with the received one or more documents for each step of a document processing pipeline. The present invention may also include processing the parsed one or more documents based on a series of processor nodes. The present invention may further include identifying one or more deviations associated with the identified one or more performance indicators corresponding with the processed one or more documents. The present invention may also include transferring the identified one or more deviations to a supervisor component. The present invention may then include generating at least one deviation escalation associated with the transferred one or more deviations. The present invention may then further include reprocessing the generated at least one deviation escalation after a human response.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for orchestrating the supervision of a cognitive pipeline (i.e., document processing pipeline or pipeline). As such, the present embodiment has the capacity to improve the technical field of multilingual natural language processing and language adaption by streamlining the process of detecting and handling anomalies in the data being processed in the cognitive pipeline.

As previously described, a machine learning pipeline may involve the activities of preparation and ingestion of unstructured and structured text, restructuring of the resulting information in a knowledge representation form, and the exposure of that knowledge through interfaces as varied as simple question and answer (i.e., Q&A) systems to large bodies of data exported for consumption in other systems.

As with any autonomous activity, the challenge may be to ensure the systems are able to cope with a multitude of variations as inputs without escalating decisions to human intervention. There may be various efforts defining levels of autonomy for unmanned systems. However, the common thread of interest for this invention may be a progressive sequence aiming at full autonomy after sufficient refinement of the decision systems, achievement of operational efficiencies equal or superior to human operation, and creation of sufficient trust in the systems.

Therefore, it may be advantageous to, among other things, operate an autonomous learning pipeline in which the invention balances the speed and reach of processing large bodies of source material with focused human oversight that is factored back in the various decisions made in the pipeline, and the usefulness of such a solution may be directly correlated to the volume of data being produced.

According to at least one embodiment, the cognitive pipeline supervision program may be based on the identification of key performance indicators for each step of a document processing pipeline, the identification of documents that result in numbers deviating from these indicators, reporting of these deviations to a centralized issue tracker, and reuse of the human response to these escalations in subsequent processing.

According to at least one embodiment, the cognitive pipeline supervision program may be based on an initial Data Ingestor followed by a series of processor nodes, each with a specific role in the processing of the ingested data from one state to another. Each component may be expected to calculate the specified performance indicators resulting from processing each document and report significant deviations. The cognitive pipeline supervision program may then push the significant deviations to a supervisor component, which then may record the reported problems on a Knowledge Issue Tracker.

According to at least one embodiment, the cognitive pipeline supervision program may be augmented by the various processor steps with unique additions or interpretations of the document, when the document is parsed, stored and placed in a Document Manager. For example, one of the steps may use a typed relation extraction service to produce a set of relations amongst mentions in the document. The present embodiment may include another step that may generate a graph representation of these relations.

According to at least one embodiment, the cognitive pipeline supervision program may make processing entirely document-centric and therefore, the outcomes of entering a document in the system may be traced back to the origins of the document. That tracing may be essential in terms of troubleshooting or evolving the system results in terms of what the systems may leverage from that document.

According to at least one embodiment, the cognitive pipeline supervision program may include one or more deviation reports. The deviation reports (i.e., deviation escalation) may include: (1) a document where the deviation or an abnormality may be reported; (2) a unique source identifier for the problem in which the supervisor component may avoid duplicating the same issue; and (3) a problem reported by a processor node.

According to at least one embodiment, the cognitive pipeline supervision program may include a domain expert. The domain expert may either be notified about the new occurrence or can periodically check a pipeline dashboard to inspect the outstanding issues and then decide on a range of responses, namely unreconcilable (i.e., the one or more documents may be deemed inadequate for consumption in the pipeline. The response may be unreconcilable for multiple reasons, such as, a document in a foreign language for which there is no readily available translation to the target language), pending fix (i.e., the issue may be addressed through modifications to the pipeline comments), pending verification (i.e., a candidate resolution to the issue may be deployed to the pipeline, such as a code modification), closed (i.e., the issue originator may re-attempt the processing that originated the issue report in the first place and verified that the problem is no longer occurring), and expected (i.e., a deviation inferred by the system through comparison or estimates may be expected for the particular documents flagged in that deviation).

In the present embodiment, the domain experts may be expected to analyze the contents of the document (i.e., article) against the eventual deviation and may then determine whether the deviation is acceptable, unrecoverable, or needs additional training for the annotators referenced by the pipeline.

According to at least one embodiment, the cognitive pipeline supervision program may include other components in the pipeline that take the transient document status into account when receiving requests to process these documents. For example, a document may be rejected if the expert declares the document is inadequate for the pipeline. The present embodiment may include minimal, or no, access of certain domain experts to the pipeline runtime or awareness of the runtime architecture, concerning the specific domain expert solely with assessing whether the documents are still acceptable to the cognitive pipeline.

According to at least one embodiment, the cognitive pipeline supervision program may include a pipeline that flows into multiple parallel data streams on behalf of different expert teams and segregate the detection, recording and notification of issues accordingly. The present embodiment may include the escalation of a share of the issues, by the domain experts, to an actual pipeline team, when the issues being raised appear to be the result of a system defect or malfunction.

According to at least one embodiment, each component of the cognitive pipeline supervision program may take the disposition of an issue into an account. If a problem is deemed unreconcilable, the cognitive pipeline supervision program may delete any reference and byproduct of processing the document from the internal state machines and external state representations (e.g., record of a database) and never attempt to process the document again. If the problem is in a "Pending fix" state, then the cognitive pipeline supervision program may remove any result of processing the document from the internal state machines and external state representations and wait until there are no more pending issues to re-attempt processing the document. A problem placed in a "Pending verification" state may cause the supervisor to notify the reporting component, which may reattempt processing the document and then notify the supervisor about the new state for the issue. If the processing fails to reveal the original problem, the component may notify the supervisor about the new state of "Closed". If the problem persists, then the cognitive pipeline supervision program may move the issue to a "New" state again and the domain expert may decide whether the problem is unreconcilable (e.g., a new understanding of the complexity of the fix may be deemed too costly and not worth the investment) or "Pending Fix" again.

According to at least one embodiment, the cognitive pipeline supervision program may confirm the notification of eventual problems to domain experts and to other components in the pipeline to withhold the processing of data. For example, an alert includes the "entity extraction" step of the natural language processing pipeline may identify an unusually high number of unique Gene_Protein entities in PubMed article 1129412. The detected number is 18 whereas the average number for other articles previously processed in the system is 3.

Figure 1:
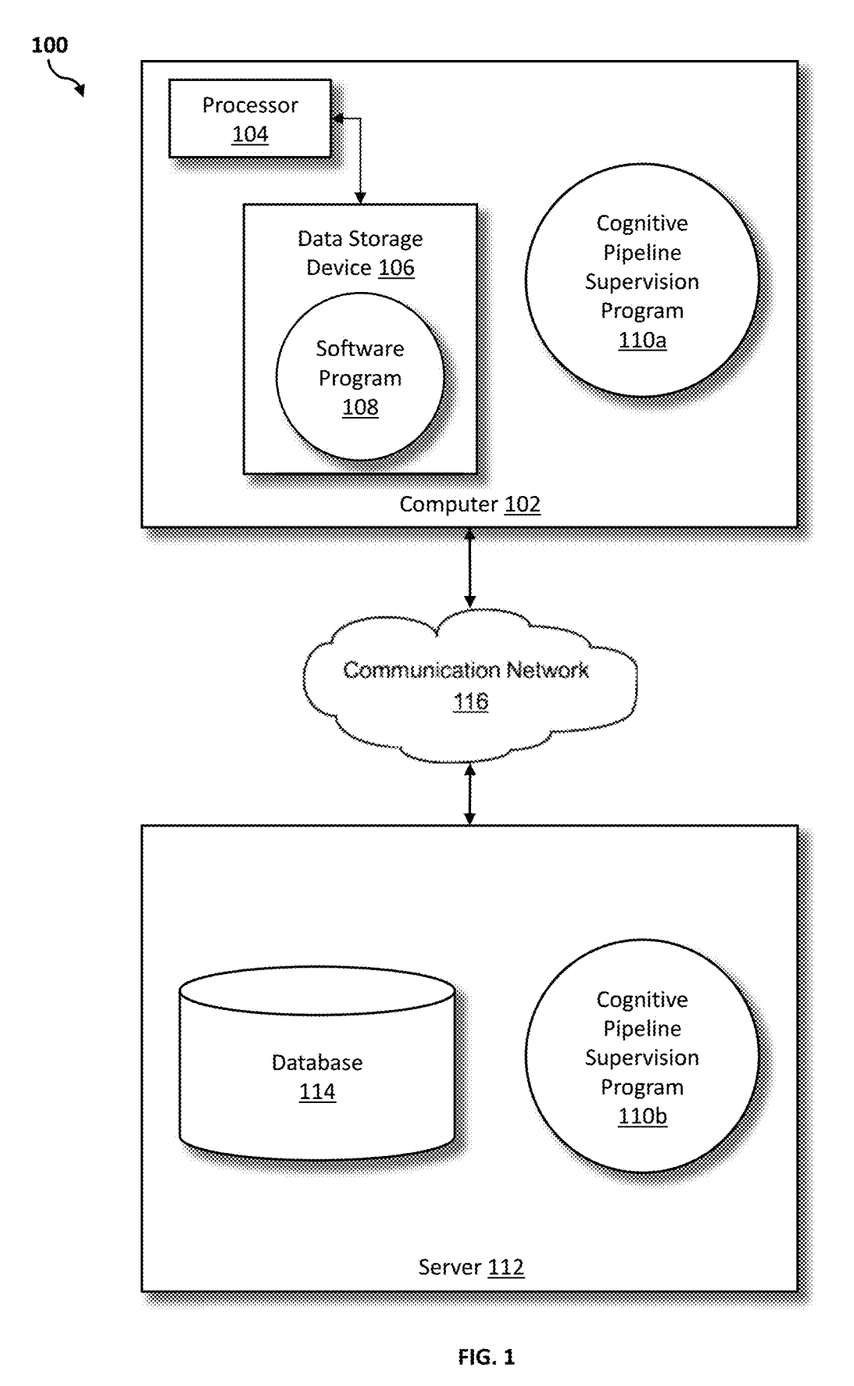
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cognitive pipeline supervision program 110a. The networked computer environment 100 may also include a server 112 that is enabled to run a cognitive pipeline supervision program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the cognitive pipeline supervision program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the cognitive pipeline supervision program 110a, 110b (respectively) to orchestrate supervision of the cognitive pipeline. The cognitive pipeline supervision method is explained in more detail below with respect to FIGS. 2 and 3.

Figure 2:
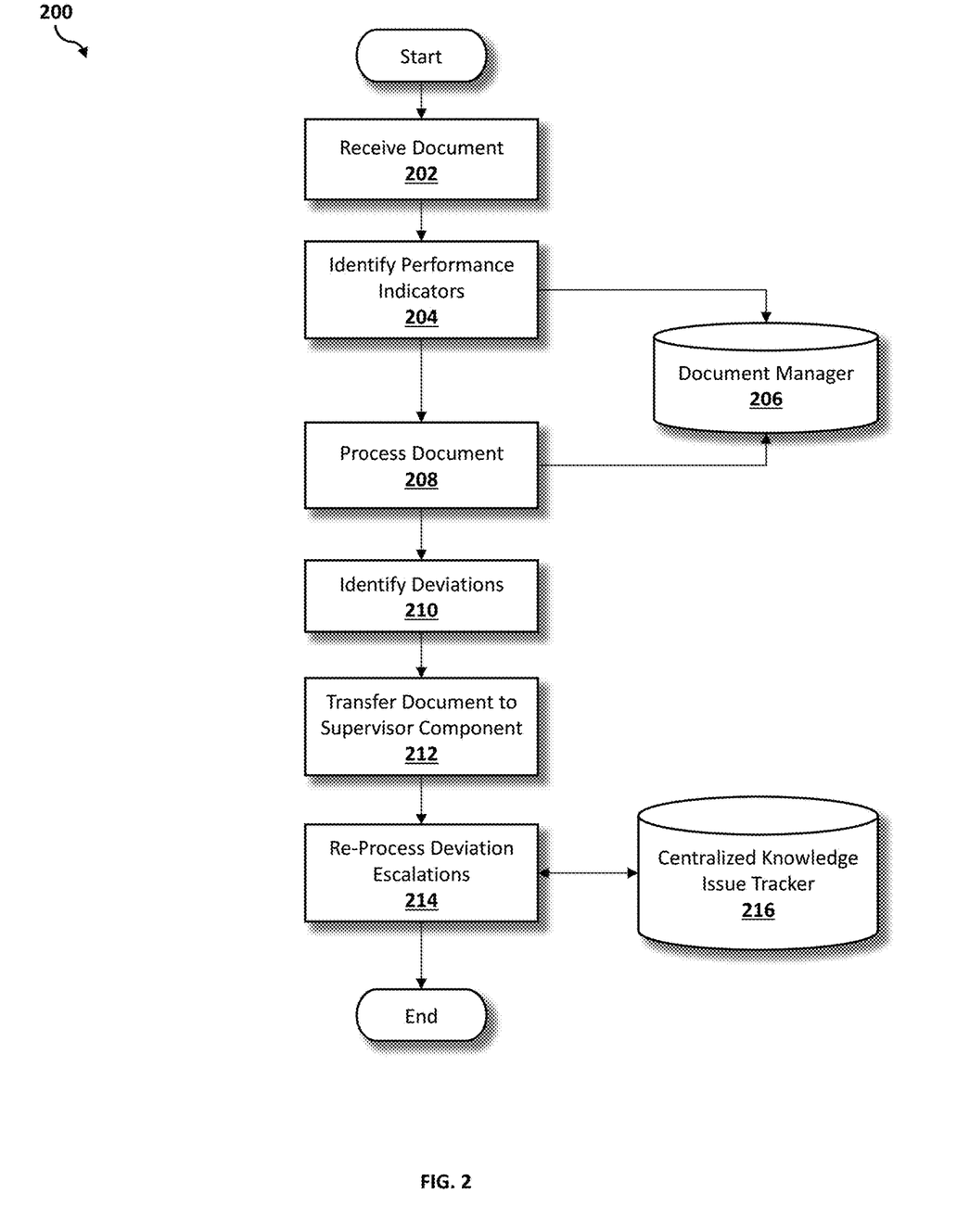
FIG. 2 is an operational flowchart illustrating a process for orchestrating supervision of a cognitive pipeline according to at least one embodiment.

Referring now to FIG. 2, an operational flowchart illustrating the exemplary cognitive pipeline supervision process 200 used by the cognitive pipeline supervision program 110a, 110b according to at least one embodiment is depicted.

At 202, one or more documents are received. Using a software program 108 on the user device (e.g., user's computer 102), one or more documents (e.g., publications, articles, reports, emails, and other forms of writings) may be received as input in a database 114. A cloud service may be utilized by a user in which documents (e.g., in a zip file) may be converted for processing and stored on the database 114 within the server 112. Alternatively, the user may manually input one or more documents directly into the cognitive pipeline supervision program 110a, 110b.

For example, a post doctorate student is a part of a university research group that is conducting research on the effects of certain environmental conditions on human genes. As such, the post doctorate student utilizes the cognitive pipeline supervision program 110a, 110b to parse through scientific publications for a list of newly documented human genes. The post doctorate student utilizes an external engine to search websites, of namely several prestigious and renowned scientific and medical journals in the field of genetics, to retrieve scientific articles with relevant content. The cognitive pipeline supervision program 110a, 110b receives seven scientific articles from the external search engine. The received articles are saved onto a server, and then saved onto a database 114 by the cognitive pipeline supervision program 110a, 110b.

In at least one embodiment, the received one or more documents may be related or pertaining to a similar topic or subject matter. As such, the cognitive pipeline supervision program 110a, 110b may parse through the documents simultaneously or consecutively as each document relates to the similar topic or subject matter (e.g., genome research and molecular biology). In another embodiment, the received one or more documents may include unrelated topics or subject matters (e.g., sports and microbiology), or different types of documents (e.g., blogs, scientific publications, non-fictional books).

Then, at 204, one or more performance indicators are identified. The cognitive pipeline supervision program 110a, 110b may utilize a Data Ingestor (i.e., an external engine) to parse through the received one or more documents to calculate and identify the one or more performance indicators for each of the received one or more documents. The one or more performance indicators may be used as measurements for the attributes associated with the received one or more documents, where the attributes are chosen to measure a desired characteristic of the one or more documents, either in absolute terms or in some form of deviation from the norm of a representative body of the documents. The one or more performance indicators may be stored in the Document Manager 206 (e.g., database 114). For example, a user responsible for training a document processing pipeline for reading scientific literature could define the absolute number of pages in a document as a performance indicator, or define the deviation from the median number of pages from documents already stored in a database as another performance indicator.

After the received one or more documents are parsed, the cognitive pipeline supervision program 110a, 110b may store the received one or more documents in a Document Manager 206. The documents may be indexed by a unique document identifier that is assigned to the received one or more documents, when the documents are ingested into the document processing pipeline. The unique document identifier may be calculated by algorithms utilizing the name of the document source and the unique identifier of the document within the at least one set of source data. For example, the unique document identifier would include an International Standard Book Number (ISBN) if the publisher bought an ISBN from the International ISBN Agency, or PubMed®-Indexed for MEDLINE (PMID) if the document is sourced from PubMed® (PubMed and all PubMed-based trademarks and logos are trademarks or registered trademarks of National Library of Medicine and/or its affiliates).

Continuing the previous example, the Data Ingestor parses through the seven scientific articles received by the cognitive pipeline supervision program 110a, 110b. The Data Ingestor assigns a unique document identifier to each of the seven scientific articles, as well as identified performance indicators, which includes the absolute number of pages in each of the seven articles.

In at least one embodiment, if the cognitive pipeline supervision program 110a, 110b fails to identify a performance indicator in the received one or more documents, the cognitive pipeline supervision program 110a, 110b may display an error message to the user. The error message may include a summary (e.g., brief list) of the one or more documents received, where a performance indicator was not identified for that document.

In another embodiment, the cognitive pipeline supervision program 110a, 110b may reject any documents that fail to include the identified performance indicator. The cognitive pipeline supervision program 110a, 110b may then provide the user with a summary of the documents in which the performance indicator is included, or a summary of the documents in which the performance indicator is excluded. Regardless of whether at least one performance indicator was identified in the document, the document may be stored in the database 114 for future use by the cognitive pipeline supervision program 110a, 110b.

Then, at 208, one or more documents are processed. The received one or more documents may be augmented by a series of processor nodes (i.e., various processor steps) with a series of unique additions or interpretations for the received one or more documents. The processing of the one or more documents may be specific to the objective of each processor node and may generate a list of additional information derived from the one or more documents that may be stored in the Document Manager 206. The generated list may serve as a basis for additional performance indicators for the received one or more documents.

In the present embodiment, the cognitive pipeline supervision program 110a, 110b may create a document-centric process for an entered document to be traced to the origins of the entered document. The cognitive pipeline supervision program 110a, 110b may utilize the tracing of the entered document to troubleshoot or determine the relations between the mentions of the entered document.

Continuing the previous example, the processor node identified newly documented genes in each of the seven scientific articles and generates a list of gene locations within each of the scientific articles, indicating the starting position, the length, and a unique gene identifier that can be used as a lookup key in the National Center of Biotechnology Information (NCBI) database. The generated list will be stored in the Document Manager 206 as additional information about the respective scientific article among the received seven scientific articles, and will serve as the basis for additional performance indicators for each of the seven scientific articles, such as the distinct number of genes found in the respective scientific article and the total number of references to genes.

Then, at 210, one or more deviations are identified. The deviations may be calculated relative to a threshold or range designed by a team or individual user (e.g., administrator) responsible for the document processing pipeline (i.e., which utilizes machine learning to process the one or more documents) following simple rules (e.g., verifying that a document has a minimum number of characters, that the number of characters falls below the 95% percentile of number of characters for all other documents processed to data).

Additionally, the team or an individual user may determine a threshold for the deviations associated with the one or more documents in which the one or more deviations may be considered a significant deviation in the corresponding one or more documents if the deviation satisfies the threshold. For example, at the bottom of the main screen, there may be a "Threshold" button, when the user clicks on that "Threshold" button, the user may be prompted (e.g., via dialog box) to input a threshold value from 0-1, or another range of normalized numbers. Any number entered in the dialog box may be the threshold value in which a weight equal to or greater than that entered threshold value may be considered a significant deviation from the document.

Alternatively, if the one or more deviations fail to satisfy the threshold, then that one or more deviations may be considered an insignificant deviation, which may be excluded from a deviation escalation and further ignored by the cognitive pipeline supervision program 110a, 110b. If, however, the threshold is changed at a later time, then the team or user may elect to reevaluate the previously generated one or more deviations based on the newly changed threshold. When a change in threshold would affect any previously generated deviation escalations, the cognitive pipeline supervision program 110a, 110b may prompt the user (e.g., via a modal dialog box) to confirm whether the user intends to change any previously generated deviation escalations. For example, when the user submits a change to the threshold, the cognitive pipeline supervision program 110a, 110b may inform the user via modal dialog box that the changed threshold may be applied to previously generated deviation escalations, and further prompt the user to confirm whether the user intends to apply the change in threshold to previously generated deviation escalations. The dialog box includes "No" and "Yes" buttons at the bottom of the modal dialog box. If the user clicks the "No" button, then the modal dialog box disappears and the change to threshold may apply to deviation escalations generated from that point and onward (i.e., present and future deviation escalations) until the user changes the threshold again. If, however, the user clicks the "Yes" button, then the modal dialog box may expand for the user to apply the new threshold to certain previously generated deviation escalations based on time period, subject matter or other criteria determined by the user. At the end of the expanded modal dialog box, there may be an option for the user to apply the changed threshold to all the previously generated deviation escalations. If the user selects that option to apply to the changed threshold to all the previously generated deviation escalations, then the user may be presented with a message from the cognitive pipeline supervision program 110a, 110b stating an exact number or range of previously generated deviation escalations which may be affected by the changed threshold, and confirming whether the user intends to proceed with that option.

The cognitive pipeline supervision program 110a, 110b may then generate one or more deviation escalations (i.e., deviation reports) that may include a document in which the one or more deviations (i.e., abnormalities) have been reported, a unique source identifier for the problem (i.e., issue) for a supervisor component to avoid duplicating the same problem, and a processor node reporting the problem.

Continuing the previous example, a deviation is the complete absence of mentions to any gene in a scientific article expected to cover a subject related to the environmental conditions that affects human genes, which may be an indication that the scientific article does not match that expectation or that the gene identification processor did not work as expected.

Then, at 212, one or more documents are transferred to the supervisor component. The cognitive pipeline supervision program 110a, 110b may transfer the one or more documents to the supervisor component via communications network 116. The supervisor component may include a domain expert, who is notified about a new occurrence (i.e., identified one or more deviations). The domain expert may then decide on a range of responses for each of the occurrences based on an analysis of the contents of the processed one or more documents against the identified one or more deviations (i.e., deviation tracking process).

In the present embodiment, the domain expert may analyze the contents of the processed one or more documents and determine whether each of the identified deviations may be acceptable, unrecoverable, or needs additional training for the annotators referenced by the pipeline. As such, the following responses may be generated for an occurrence: (1) unreconcilable (i.e., one or more documents may be deemed inadequate for consumption in the document processing pipeline (i.e., pipeline) based on multiple reasons, such as the document including a foreign language for which there is no readily available translation to the target language); (2) pending fix (i.e., the issue may be addressed through modifications to the pipeline components); (3) pending verification (i.e., a candidate resolution to the issue may be deployed to the pipeline (e.g., a code modification)); (4) closed (i.e., the issue originator may re-attempt the processing that originated the issue and verify that the issue is no longer occurring or present); and (5) expected (i.e., deviation may infer through comparison or estimates that may be expected for the processed one or more documents flagged in the identified one or more deviations). A user may define additional responses to reflect deeper subtleties in the document processing pipeline associated with an organization managing the document processing pipeline. However, the document processing pipeline may include this minimum set of states (e.g., unreconcilable, pending fix, pending verification, closed and expected) for the document. For example, a user may define an approval process for the fix, where one or more people need to accept the proposed fix before it is deployed to the document processing pipeline. The number of people assigned to the supervision task may be allocated to match the expected volume of deviations identified in the cognitive pipeline supervision program 110a, 110b in which careful consideration on the choices of performance metrics for each document and the choice of ranges of acceptable values for those metrics are necessary.

In the present embodiment, if a problem is deemed unreconcilable, the cognitive pipeline supervision program 110a, 110b may delete any reference and byproduct of processing the document from the internal state machines and external state representations (e.g., record of a database) and never attempt to process the document again.

In the present embodiment, if the problem is in a "Pending fix" state, then the cognitive pipeline supervision program 110a, 110b may remove any result of processing the document from the internal state machines and external state representations and wait until there are no more pending issues to re-attempt processing the document.

In the present embodiment, a problem placed in a "Pending verification" state may cause the supervisor component to notify the reporting component, which may re-attempt processing the document and then notify the supervisor component about the new state for the issue. If the processing fails to reveal the original problem, the cognitive pipeline supervision program 110a, 110b may notify the supervisor component about the new state of "Closed". If the problem persists, then the cognitive pipeline supervision program 110a, 110b may move the issue to a "New" state again and the domain expert may decide whether the problem is unreconcilable (e.g., a new understanding of the complexity of the fix may be deemed too costly and not worth the investment) or "Pending Fix" again.

Continuing the previous example, the seven scientific articles are transferred to the supervisor component in which the domain expert reviewed each of the seven scientific articles to determine whether the presence or absence of environmental conditions in the effect of human genes were mentioned in each of the seven scientific articles. After an analysis of the content in each of the scientific articles, the domain expert decided on the following responses: two of the scientific articles were placed in a "Pending Verification" state; one was placed in a "Closed" state; two were placed in a "Pending Fix" state; one was placed in an "Unreconcilable" state; and one was placed in an "Expected" state.

In another embodiment, the domain expert may periodically check a document processing pipeline dashboard to inspect the outstanding issues associated with the identified one or more deviations. In at least one other embodiment, the cognitive pipeline supervision program 110a, 110b may take the transient document status into account when receiving requests to process the received one or more documents.

In another embodiment, the domain experts may have minimal (if any) access to the pipeline runtime or awareness of the runtime architecture, concerning whether the received one or more documents may be acceptable to the pipeline. The pipeline may flow to multiple parallel data streams on behalf of different domain expert teams and may segregate the detection, recording and notification of issues accordingly.

In another embodiment, the domain experts may escalate a share of the issues to the actual pipeline DevOps (i.e., Development and Operations) team, when the issues being raised appear to be the result of a defect or malfunction of the cognitive pipeline supervision program 110a, 110b.

Then, at 214, one or more deviation escalations are re-processed. The cognitive pipeline supervision program 110a, 110b may report a deviation escalation to a centralized knowledge issue tracker database 216 (i.e., database 114). The cognitive pipeline supervision program 110a, 110b may then reuse the human response (i.e., the response generated by at least one domain expert) to the one or more deviation escalations in subsequent processing for the processed one or more documents (i.e., resolution process).

Continuing the previous example, if the human assessment is that the deviation is unreconcilable, then the scientific article will be marked as such within the Document Manager 206 and all of the aggregated information produced by document processors (e.g., the gene identification processor) will be removed from consideration from the cognitive pipeline supervision program 110a, 110b, in which the associated performance metrics will not be utilized to calculate aggregate statistics, nor will it be further processed by other document processors. If the human assessment is that the identification warrants a correction ("pending fix" assessment), then the scientific article will be marked as such while the resolution is implemented, which may entail activities like requesting a modified copy of the scientific article from the document publisher or modifying the algorithm for a scientific article. Once the fix is deployed in the pipeline, the scientific article state may be moved to "pending verification", which instructs all document processors to reprocess the scientific article and re-calculate their performance indicators, at which point the supervisor component will reevaluate the performance indicators for deviation and indicate whether the metrics for the scientific article are within the specified range (i.e., they would not be flagged as deviations) and finally change the original deviation status to "closed". If the original deviations are marked as "Expected", then the deviation will be marked as such within the Knowledge Issue Tracker 216 so that there are no longer trigger alerts for those metrics for that specific scientific article.

In at least one embodiment, the cognitive pipeline supervision program 110a, 110b may utilize the human response (e.g., response from at least one domain expert) as a form of feedback to improve the parsing, processing and generating functions of the cognitive pipeline supervision program 110a, 110b. As such, the cognitive pipeline supervision program 110a, 110b may utilize machine learning to improve over time based on the human response received by the domain experts.

Figure 3:
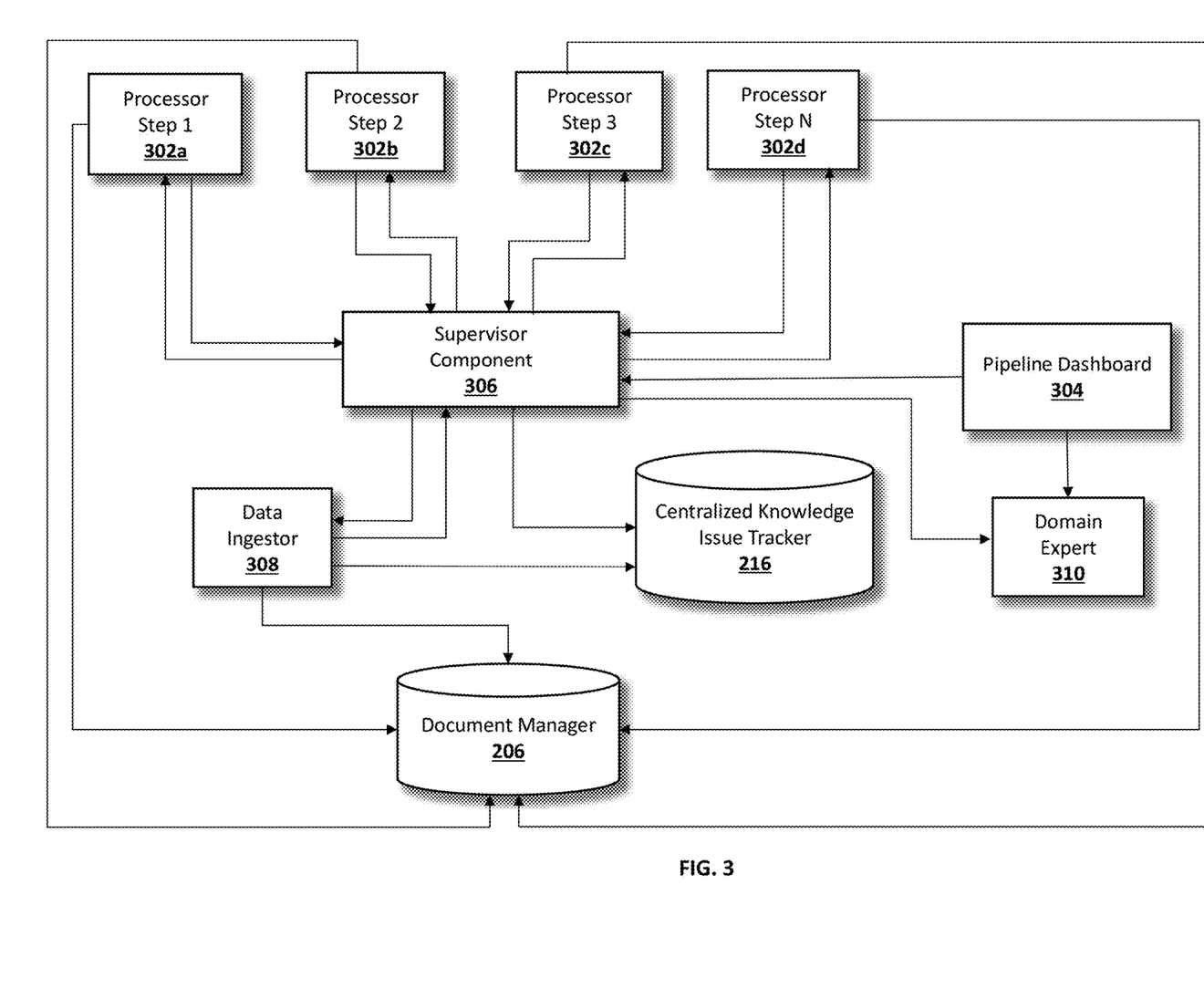
FIG. 3 is an operational flowchart illustrating a process for orchestrating supervision of a cognitive pipeline for multiple processor steps according to at least one embodiment.

Referring now to FIG. 3, an operational flowchart illustrating the exemplary cognitive pipeline supervision process for multiple processor steps used by the cognitive pipeline supervision program 110a, 110b according to at least one embodiment is depicted.

As shown, cognitive pipeline supervision program 110a, 110b may include multiple "Processor Step" components (i.e., Processor Step 1 302a, Processor Step 2 302b, Processor Step 3 302c, Processor Step N 302d) that represent two or more document processors that interact with the received one or more documents ingested into the Document Manager 206. The first processing step may be performed by the Data Ingestor 308, which is responsible for the acquisition of the received one or more documents from a data source and subsequently request its storage via the Document Manager 206.

The Pipeline Dashboard 304 may notify the Supervisor Component 306 about the existence of the new document, which then propagates the notification the multiple "Processor Step" components at 302*a*, 302*b*, 302*c*, 302*d*. The multiple "Processor Step" components at 302*a*, 302*b*, 302*c*, 302*d* may initiate the calculation of the aggregated information about the one or more documents received, as well as calculate the performance indicators for the documents.

The functionality of the computer may be improved by the cognitive pipeline supervision program 110*a*, 110*b* because the tasks for detecting and handling anomalies in data (e.g., one or more documents) is automated, thereby allowing the computer to detect and handle anomalies in data in such a way that was not previously performed by a computer. The cognitive pipeline supervision program 110*a*, 110*b* streamlines the detection and handling of anomalies in data with greater efficiency and accuracy and incorporates human response (i.e., reprocessing the deviation escalation after a human response) to further improve the computer's functionality.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
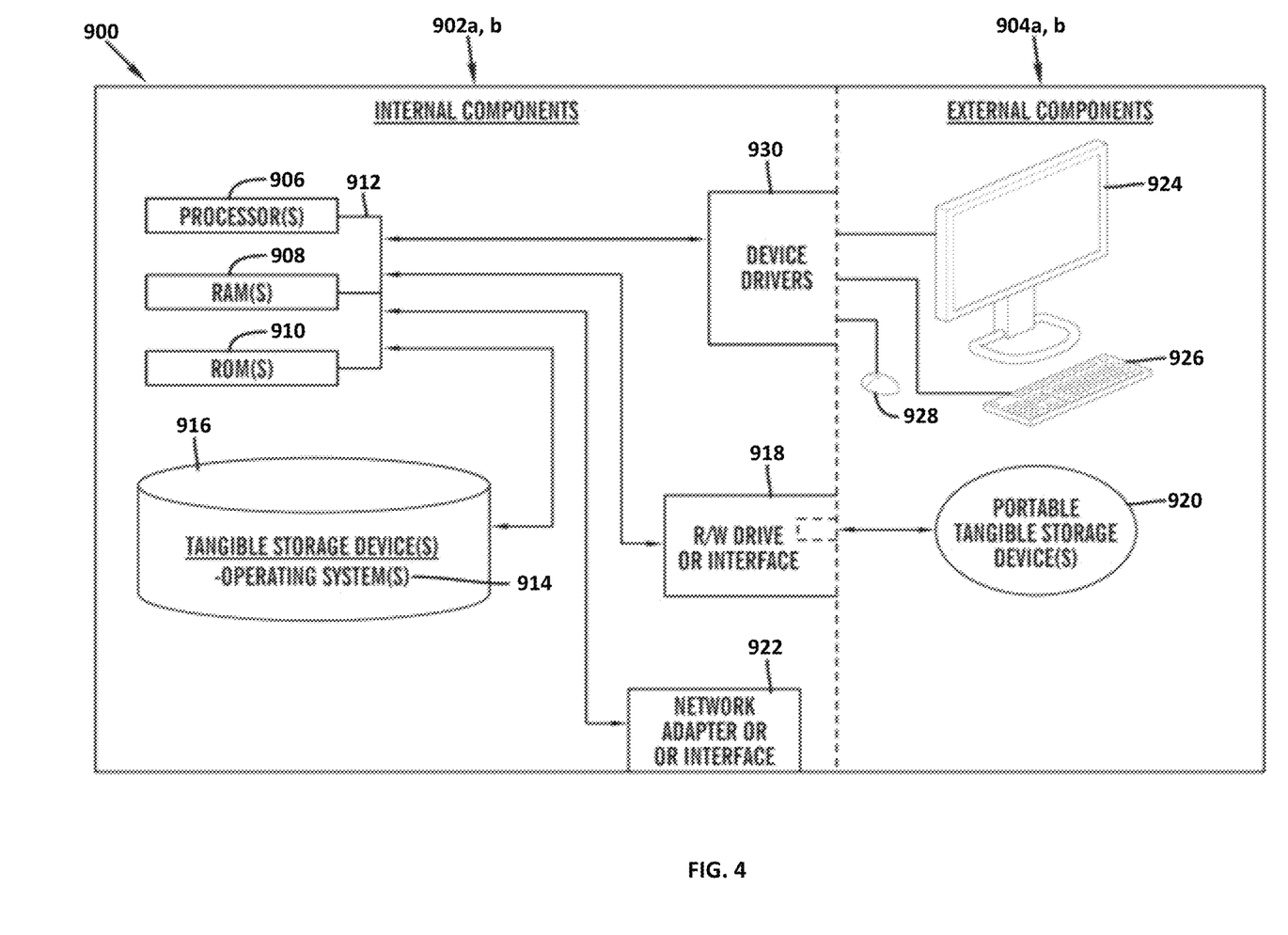
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the cognitive pipeline supervision program 110*a* in client computer 102, and the cognitive pipeline supervision program 110*b* in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the cognitive pipeline supervision program 110*a*, 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless Wi-Fi interface cards, or 3G or 4G wireless interface cards or other wired or wireless communication links. The software program 108 and the cognitive pipeline supervision program 110*a* in client computer 102 and the cognitive pipeline supervision program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cognitive pipeline supervision program 110*a* in client computer 102 and the cognitive pipeline supervision program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
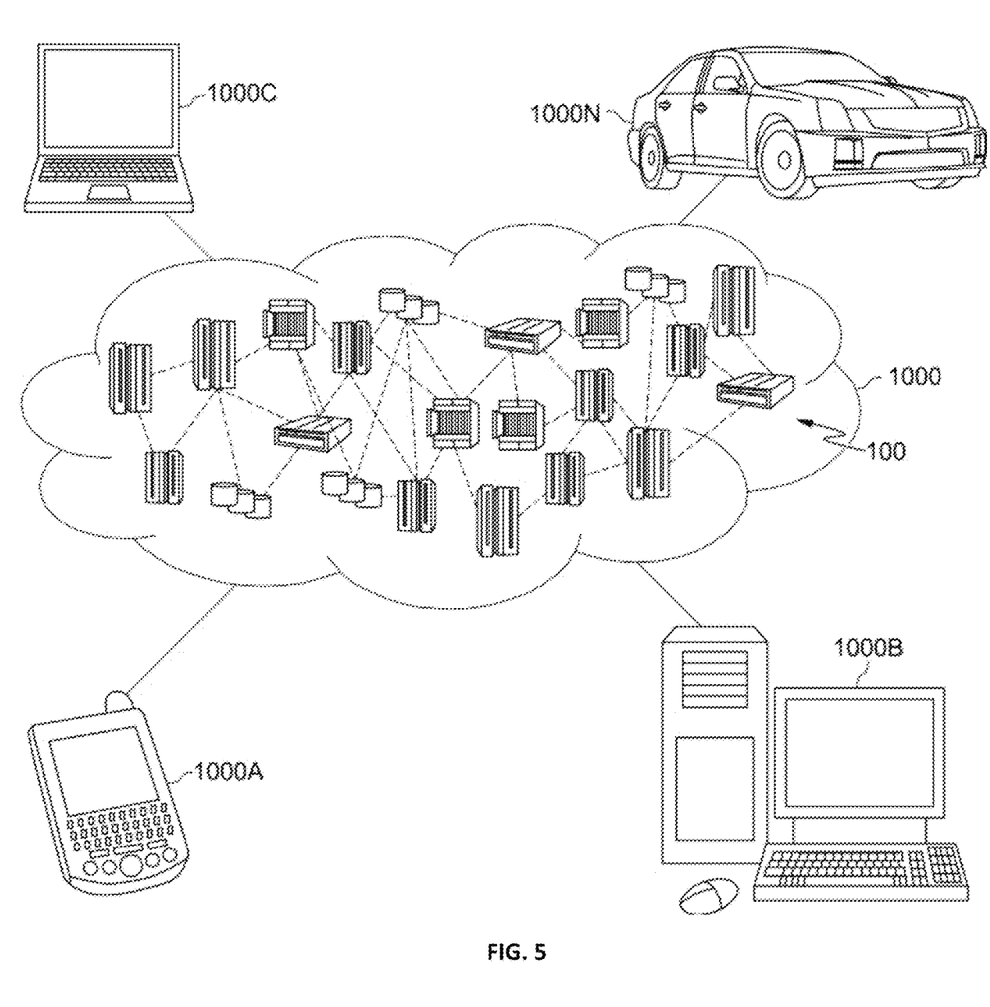
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
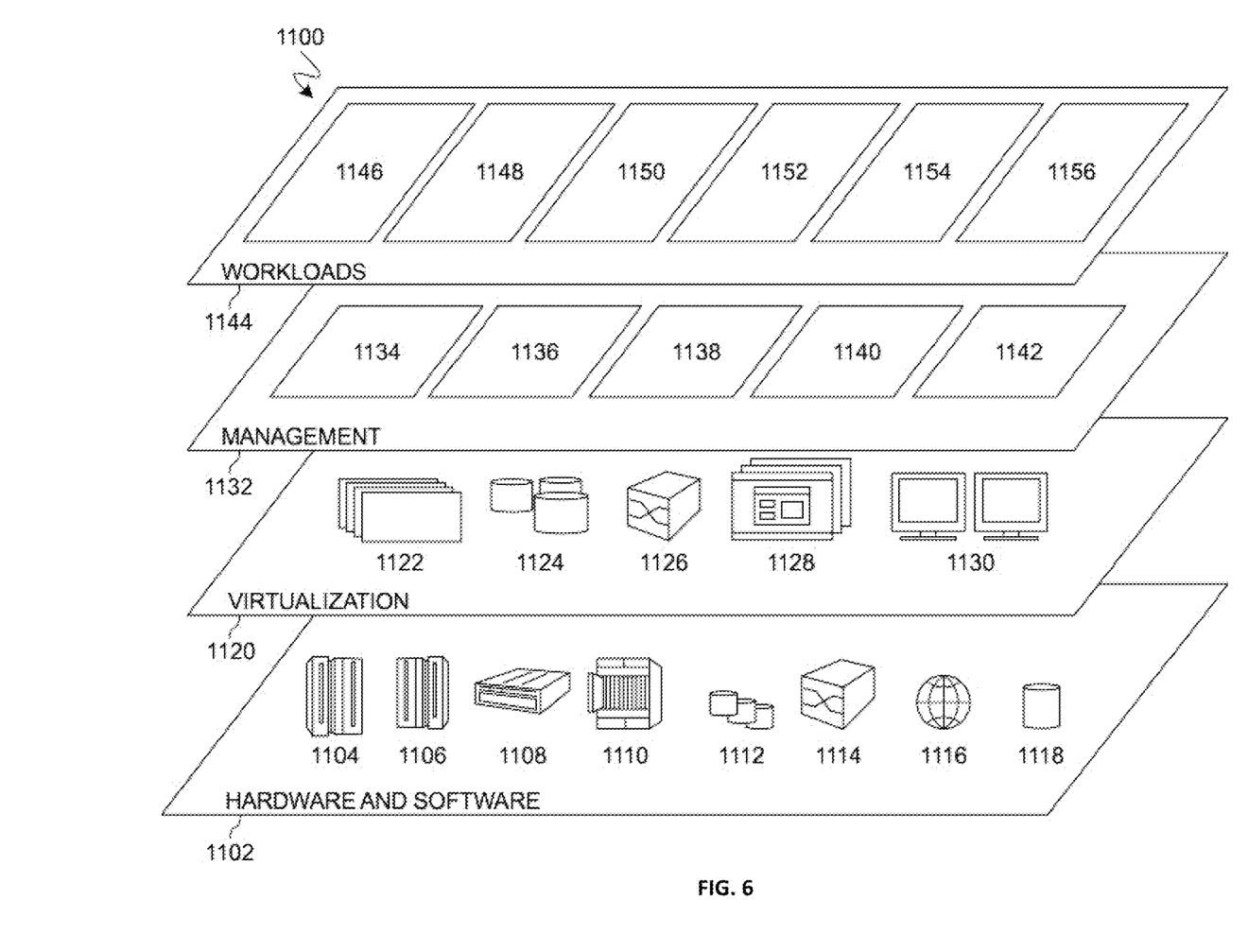
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and cognitive pipeline supervision 1156. A cognitive pipeline supervision program 110a, 110b provides a way to orchestrate the supervision of the cognitive pipeline.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for coordinating supervision of at least one unstructured text document processing pipeline, the method comprising:

receiving one or more documents;

parsing the received one or more unstructured text documents to identify one or more performance indicators associated with the received one or more unstructured text documents for each step of a document processing pipeline, the one or more performance indicators used as measurements for attributes associated with the received one or more unstructured text documents and the attributes measure a desired characteristic of the one or more documents;

processing the parsed one or more unstructured text documents based on a series of processor nodes;

identifying one or more deviations associated with the identified one or more performance indicators corresponding with the processed one or more documents, the one or more deviations indicating a deviation from a norm of attributes within a representative body of unstructured text documents, the representative body of unstructured text documents processed using the document processing pipeline to determine the norm of attributes associated with the representative body of unstructured text documents;

transferring the identified one or more deviations from the norm of the representative body of unstructured text documents to a supervisor component;

generating at least one deviation escalation associated with the transferred one or more deviations, the deviation escalation including a document in which the one or more deviations from the norm of characteristics within the representative body of text documents are reported; and reprocessing the generated at least one deviation escalations after a human response, reprocessing the generated at least one deviation escalation involving reusing the human response to the at least one deviation escalation in subsequent document processing.

2. The method of claim 1, wherein transferring the identified one or more deviations to the supervisor component, comprises:

recording, by the supervisor component, the generated at least one deviation escalation to a centralized knowledge issue tracker, wherein the supervisor component includes at least one domain expert;

notifying at least one domain expert of the identified one or more deviations from the norm of the representative body of documents associated with the processed one or more documents;

analyzing a plurality of contents associated with the processed one or more documents with the identified one or more deviations associated with the processed one or more documents; and determining, by the notified at least one domain expert, a response based on the analyzed plurality of contents associated with the processed one or more documents.

3. The method of claim 2 in which the determined response includes at least one of an unreconcilable state, a pending fix state, a pending verification state, a closed state, and an expected state.

4. The method of claim 1, further comprising:

storing the processed one or more documents in a Document Manager.

5. The method of claim 1, wherein processing the received one or more documents based on the series of processor nodes, further comprises:

generating a list of a plurality of additional information associated with the processed one or more documents, wherein the generated list is utilized as a plurality of additional performance indicators for the processed one or more documents; and storing the generated list of the plurality of additional information into a Document Manager.

6. The method of claim 1, wherein generating the at least one deviation escalation associated with the transferred one or more deviations further comprises:

receiving a threshold for the identified one or more deviations associated with the processed one or more documents;

determining the identified one or more deviations associated with the processed one or more documents satisfies a threshold, the one or more deviations indicating the deviation from the norm of the representative body of documents; and determining the at least one deviation escalation associated with the determined one or more deviations to the corresponding processed one or more documents.

7. The method of claim 6, wherein the determined at least one deviation escalation includes a document associated with the identified one or more deviations, a unique source identifier associated with the processed one or more documents and the series of processor nodes associated with the processed one or more documents.

8. A computer system for coordinating supervision of at least one document processing pipeline, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving one or more documents;
parsing the received one or more unstructured text documents to identify one or more performance indicators associated with the received one or more unstructured text documents for each step of a document processing pipeline, the one or more performance indicators used as measurements for attributes associated with the received one or more unstructured text documents and the attributes measure a desired characteristic of the one or more documents;
processing the parsed one or more unstructured text documents based on a series of processor nodes;
identifying one or more deviations associated with the identified one or more performance indicators corresponding with the processed one or more documents, the one or more deviations indicating a deviation from a norm of attributes within a representative body of unstructured text documents, the representative body of unstructured text documents processed using the document processing pipeline to determine the norm of attributes associated with the representative body of unstructured text documents;
transferring the identified one or more deviations from the norm of the representative body of unstructured text documents to a supervisor component;
generating at least one deviation escalation associated with the transferred one or more deviations, the deviation escalation including a document in which the one or more deviations from the norm of characteristics within the representative body of text documents are reported; and
reprocessing the generated at least one deviation escalations after a human response, reprocessing the generated at least one deviation escalation involving reusing the human response to the at least one deviation escalation in subsequent document processing.

9. The computer system of claim 8, wherein transferring the identified one or more deviations to the supervisor component, comprises:
recording, by the supervisor component, the generated at least one deviation escalation to a centralized knowledge issue tracker, wherein the supervisor component includes at least one domain expert;
notifying at least one domain expert of the identified one or more deviations from the norm of the representative body of documents associated with the processed one or more documents;
analyzing a plurality of contents associated with the processed one or more documents with the identified one or more deviations associated with the processed one or more documents; and determining, by the notified at least one domain expert, a response based on the analyzed plurality of contents associated with the processed one or more documents.

10. The computer system of claim 9 in which the determined response includes at least one of an unreconcilable state, a pending fix state, a pending verification state, a closed state, and an expected state.

11. The computer system of claim 8, further comprising:
storing the processed one or more documents in a Document Manager.

12. The computer system of claim 8, wherein processing the received one or more documents based on the series of processor nodes, further comprises:
generating a list of a plurality of additional information associated with the processed one or more documents, wherein the generated list is utilized as a plurality of additional performance indicators for the processed one or more documents; and
storing the generated list of the plurality of additional information into a Document Manager.

13. The computer system of claim 8, wherein generating the at least one deviation escalation associated with the transferred one or more deviations further comprises:
receiving a threshold for the identified one or more deviations associated with the processed one or more documents;
determining the identified one or more deviations associated with the processed one or more documents satisfies a threshold, the one or more deviations indicating the deviation from the norm of the representative body of documents; and
determining the at least one deviation escalation associated with the determined one or more deviations to the corresponding processed one or more documents.

14. The computer system of claim 13, wherein the determined at least one deviation escalation includes a document associated with the identified one or more deviations, a unique source identifier associated with the processed one or more documents and the series of processor nodes associated with the processed one or more documents.

15. A computer program product for coordinating supervision of at least one unstructured text document processing pipeline, comprising:
one or more computer-readable storage media and program instructions stored on at least one of the one or more tangible storage media, the program instructions executable by a processor to cause the processor to perform a method comprising:
receiving one or more documents;
parsing the received one or more unstructured text documents to identify one or more performance indicators associated with the received one or more unstructured text documents for each step of a document processing pipeline, the one or more performance indicators used as measurements for attributes associated with the received one or more unstructured text documents and the attributes measure a desired characteristic of the one or more documents;
processing the parsed one or more unstructured text documents based on a series of processor nodes;
identifying one or more deviations associated with the identified one or more performance indicators corresponding with the processed one or more documents, the one or more deviations indicating a deviation from a norm of attributes within a representative body of unstructured text documents, the representative body of unstructured text documents processed using the document processing pipeline to determine the norm of attributes associated with the representative body of unstructured text documents;

transferring the identified one or more deviations from the norm of the representative body of unstructured text documents to a supervisor component;

generating at least one deviation escalation associated with the transferred one or more deviations, the deviation escalation including a document in which the one or more deviations from the norm of characteristics within the representative body of text documents are reported; and reprocessing the generated at least one deviation escalations after a human response, reprocessing the generated at least one deviation escalation involving reusing the human response to the at least one deviation escalation in subsequent document processing.

16. The computer program product of claim 15, wherein transferring the identified one or more deviations to the supervisor component, comprises:

recording, by the supervisor component, the generated at least one deviation escalation to a centralized knowledge issue tracker, wherein the supervisor component includes at least one domain expert;

notifying at least one domain expert of the identified one or more deviations from the norm of the representative body of documents associated with the processed one or more documents;

analyzing a plurality of contents associated with the processed one or more documents with the identified one or more deviations associated with the processed one or more documents; and determining, by the notified at least one domain expert, a response based on the analyzed plurality of contents associated with the processed one or more documents.

17. The computer program product of claim 16 in which the determined response includes at least one of an unreconcilable state, a pending fix state, a pending verification state, a closed state, and an expected state.

18. The computer program product of claim 15, further comprising:

storing the processed one or more documents in a Document Manager.

19. The computer program product of claim 15, wherein processing the received one or more documents based on the series of processor nodes, further comprises:

generating a list of a plurality of additional information associated with the processed one or more documents, wherein the generated list is utilized as a plurality of additional performance indicators for the processed one or more documents; and storing the generated list of the plurality of additional information into a Document Manager.

20. The computer program product of claim 15, wherein generating the at least one deviation escalation associated with the transferred one or more deviations further comprises:

receiving a threshold for the identified one or more deviations associated with the processed one or more documents;

determining the identified one or more deviations associated with the processed one or more documents satisfies a threshold, the one or more deviations indicating the deviation from the norm of the representative body of documents; and determining the at least one deviation escalation associated with the determined one or more deviations to the corresponding processed one or more documents.

21. The method of claim 1, wherein the deviation escalation comprises a deviation report regarding the identified one or more deviations, the deviation report indicating a document where a deviation or an abnormality may be reported, a unique source identifier for a problem in which the supervisor component may avoid duplicating a same issue, and a problem reported by the processor node.

* * * * *